3,761,229
ENGINE EXHAUST GAS PURIFICATION SYSTEM
Charles W. Schwartz, Dearborn, Mich., assignor to Ford
  Motor Company, Dearborn, Mich.
Filed July 19, 1971, Ser. No. 163,814
Int. Cl. F01n 3/14
U.S. Cl. 23—288 F
9 Claims

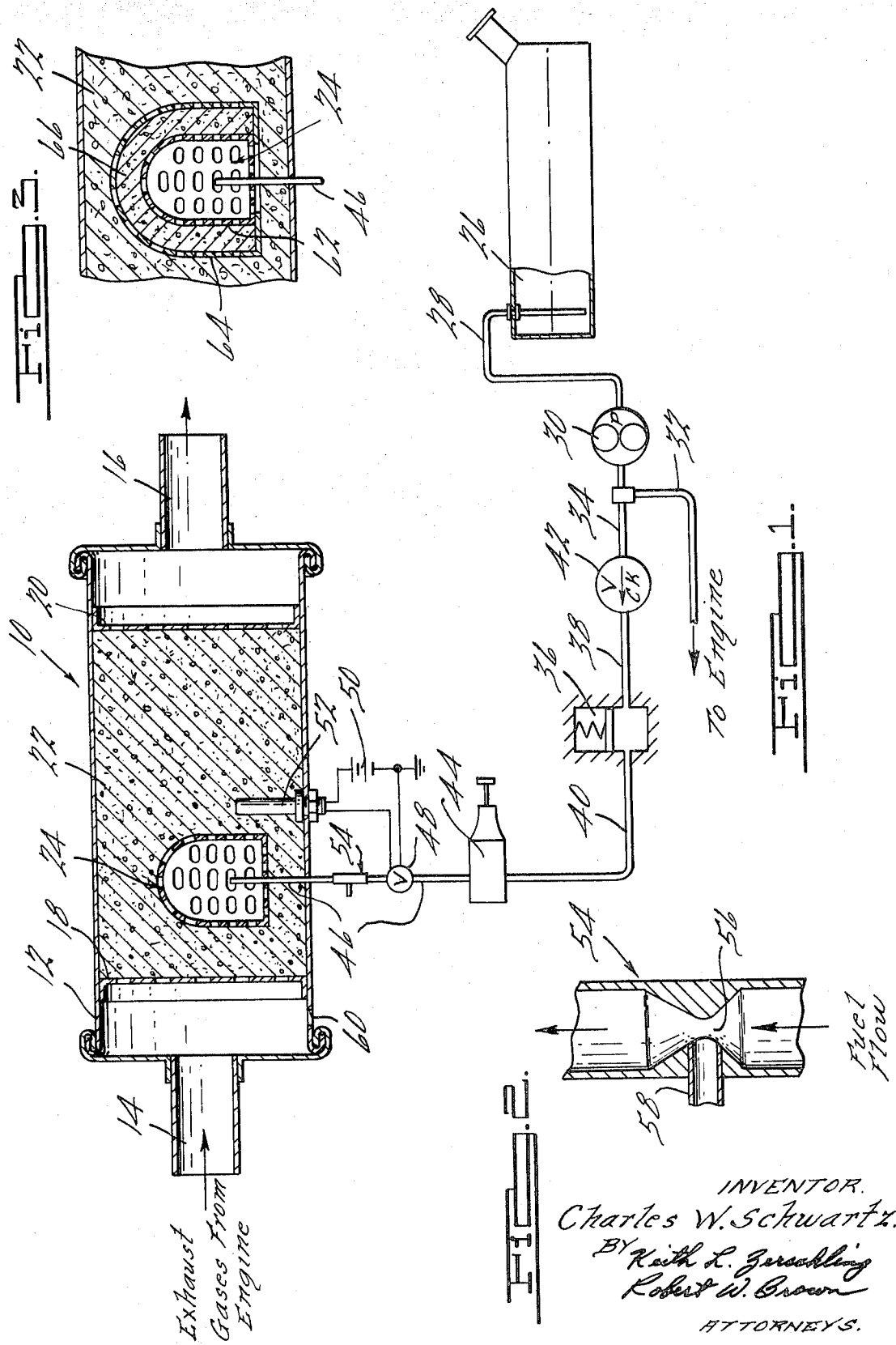

ABSTRACT OF THE DISCLOSURE

Described is a system for the purification of exhaust gases emanating from an internal combustion engine. The system includes a catalytic converter and means for supplying fuel to the catalytic converter when the engine is inoperative. The system may include a fuel container, a fuel pump, a check valve, an accumulator, and a pressure regulator. Fuel from the pressure regulator may be supplied to a gas-permeable chamber positioned proximate the catalyst in the catalytic converter. Fuel supplied to the catalytic converter from the pressure regulator exothermically reacts with air. The reaction is assisted by the catalyst in the converter, and the reaction heat maintains the catalyst at an effective temperature.

BACKGROUND OF THE INVENTION

This invention relates to a system for the purification of exhaust gases emanating from an internal combustion engine. More particularly, the invention relates to an exhaust gas purification system in which a catalytic converter is used for the selective oxidation or reduction of undesirable exhaust gas constituents.

Considerable effort is being expended by the automobile industry and others in an attempt to decrease the undesirable constituents of the exhaust gases that emanate from internal combustion engines of all kinds. The undesirable exhaust gas constituents include unburned hydrocarbons, carbon monoxide, and nitrogen oxides. It appears at this time that to decrease substantially these emissions beyond levels presently achieved will require the use of a catalytic converter to oxidize the unburned hydrocarbons and carbon monoxide and perhaps also to aid in the reduction of the nitrogen oxides. Unfortunately, the proposed catalytic materials for such converters have a minimum temperature below which they are relatively ineffective as compared to their catalytic activity at temperatures above this minimum. This temperature differs somewhat for each catalyst, but it is typically in the region of about 500° F. for those materials presently considered suitable for extended use in automotive applications.

Because proposed catalytic materials have this minimum temperature below which they are quite ineffective in oxidizing and reducing undesirable exhaust gas constituents, the catalytic converter is unable during approximately the first two minutes of engine operation after a cold start to reduce substantially the undesirable engine exhaust emissions. Thus, an engine which is initially cold, that is, at or near ambient temperature, requires approximately two minutes of operation before its exhaust gases will have heated the catalytic material sufficiently to render it substantially effective in assisting the chemical oxidation or reduction of undesirable exhaust gas constituents.

SUMMARY OF THE INVENTION

The present invention is intended to provide an exhaust purification system including a catalytic converter able immediately upon the startup of a cold engine to substantially reduce undesirable exhaust gas constituents.

In accordance with the invention, an exhaust purification system for an internal combustion engine includes a catalytic converter containing a catalyst. The converter has an inlet for receiving, and an outlet for discharging, exhaust gases from the engine. Of considerable importance is the inclusion in the system of means for supplying fuel to the converter when the engine is inoperative. Once the engine has been operated to heat the catalyst in the converter to its effective temperature, the supply of fuel thereto when the engine is inoperative will cause a catalytically assisted reaction to take place in the converter that produces sufficient heat to maintain the catalyst at or near its effective temperature. Thereafter, a cold engine may be started and the converter will be immediately effective in reducing the quantity of undesirable exhaust gas emissions. The fuel supplied to the converter can be made to react with air without the production of a flame.

The means for supplying fuel to the converter may comprise a fuel container and a fuel pump. The pump supplies fuel through a check valve to an accumulator. The accumulator stores the fuel under pressure. The accumulator is connected to a pressure regulator. Fuel flows from the pressure regulator, through a fuel supply line, to the catalytic converter. The fuel is discharged at a position proximate the catalyst in the converter. Preferably, the fuel is discharged in the converter in the form of a vapor. A gas permeable chamber positioned proximate or surrounded by the catalyst in the converter may be utilized to permit expansion of the fuel discharged from the fuel supply line connected with the pressure regulator.

Preferably, fuel discharged from the fuel supply line into the catalytic converter is mixed with air prior to its discharge. For this purpose, a venturi tube may be positioned in the fuel supply line connecting the pressure regulator with the catalytic converter. Alternatively, other means for mixing air with fuel discharged by the pressure regulator may be provided. For example, the converter may have a valved or unvalved air inlet in its housing.

The invention may be better understood by reference to the description which follows and to the drawings.

BRIEF DESCRIPTION OF THE DRAWINGS

FIG. 1 is a diagrammatic view of an exhaust purification system in accordance with the invention;

FIG. 2 is an enlarged sectional diagrammatic view of a venturi tube which may be used in the system of FIG. 1 and which is shown therein as a block; and FIG. 3 is a diagrammatic sectional view of an alternative embodiment for a portion of the system of FIG. 1.

DETAILED DESCRIPTION OF THE INVENTION

With particular reference to FIG. 1, a system for the purification of exhaust gases emanating from an internal combustion engine includes a catalytic converter shown generally at 10. The converter 10 includes a housing 12 having an inlet 14 for exhaust gases emanating from the engine and having an outlet 16 for the discharge from the converter 10 of such gases. Positioned near the inlet 14 is a gas-permeable upstream catalyst-retention baffle 18. Positioned near the converter outlet 16 is a downstream gas-permeable catalyst-retention baffle 20. A catalyst bed 22 comprised of particulate catalytic material is contained between the baffles 18 and 20. Positioned within the catalyst bed 22 is a gas-permeable chamber 24.

The catalytic converter diagrammatically illustrated in FIG. 1 is of the type having the catalyst in the form of particles. However, the invention is applicable as well to converters of the type having the catalyst coated on a honey-comb substrate or the like.

With continued reference to the system of FIG. 1, a fuel tank or container 26 is connected by a conduit 28 to the low pressure side of a fuel pump 30. The high pressure output from the fuel pump 30 may be divided between a conduit 32 for supplying fuel to the engine and a conduit 34 for supplying fuel to the catalytic converter. Thus, the fuel container 26 and pump 30 may be those conventionally employed in motor vehicles for supplying fuel to the engine, the fuel pump being actuated only during engine operation.

An accumulator 36 having an inlet conduit 38 and an outlet conduit 40 is provided for the fuel supply system for the catalytic converter. The accumulator 36 is used for the storage of fuel under pressure. A check valve 42 is connected between the inlet to the accumulator 36 and the output from the fuel pump 30 for the purpose of permitting fuel flow into the accumulator and for preventing reverse fuel flow from the accumulator inlet.

The accumulator outlet conduit 40 connects the accumulator 36 with a pressure regulator 44. The pressure regulator 44 controls the pressure and quantity of fuel supplied through a fuel supply line 46 to the catalytic converter. The fuel supply line 46 terminates in the gas-permeable chamber 24. Preferably, fuel in this chamber is in the form of a vapor and this vapor is permitted to expand upon its discharge from the line 46.

The fuel supply line 46 may have an on-off valve 48 positioned within it to permit the fuel supply to the converter 10 to be discontinued. Preferably, the valve 48 is solenoid operated with fuel flow being blocked when the solenoid is energized. A circuit for controlling the valve 48 may comprise a source of electrical energy 50 connected in series with a temperature sensitive switch 52 positioned on or within the catalytic converted 10 for directly or indirectly sensing the temperature of the catalyst bed 22 therein. The temperature sensitive switch 52 is used to energize the valve 48, thereby, to block flow of fuel to the converter 10 when the catalyst temperature is above a predetermined value. For example, if the catalyst has a temperature at which it is effective in substantially reducing undesirable exhaust gas constituents of about 500° F., then the temperature sensitive switch 52 may be made operative at a temperature of, for example, 650° F.

Connected downstream of the valve 48 is a venturi tube 54. The venturi tube 54 is shown in detail in the enlarged sectional view of FIG. 2. It includes a restriction 56 in the fuel supply line 46 which is used to produce a localized reduction in fuel line pressure to mix air entering the venturi tube through a passage 58 with the fuel flowing in the fuel supply line 46. Thus, a mixture of air and fuel is supplied to the gas permeable chamber 24 in the converter 10. If necessary, a valve may be positioned on the downstream side of the venturi tube 54 to prevent exhaust gases from flowing out of the air inlet 58 when the engine is operating.

As an alternative to the use of a venturi tube for mixing air with the fuel, an opening 60 in the housing 12 of the converter 10 may be provided to supply air to the catalyst bed 22. A valve (not shown) may be associated with the air opening 60 for the purpose of controlling the flow of air into the converter 10 and for preventing the discharge of exhaust gases through the opening when the engine is operative.

For the purpose of illustrating the operation of the exhaust purification system of the invention, let it be assumed that the system is installed in a motor vehicle having an internal combustion engine and further that the engine has been operated for a time period sufficient for the exhaust gases to heat the catalyst 22 to a temperature above its effective value. In such case, the accumulator 36 will have been filled with fuel under pressure.

Let it now be assumed that the engine has been rendered inoperative. Fuel will then flow through the accumulator outlet conduit 40 to the pressure regulator 44. Given sufficient time in this inoperative condition, the engine will cool down to the ambient temperature. However, through the use of the inventive system, the catalyst, or at least portion thereof, in the converter 10 will remain at a temperature at or near the value at which it is effective in substantially reducing undesirable exhaust gas emissions. This results because fuel from the pressure regulator 44 flows through the fuel supply line 46 into the gas-permeable chamber 24 where it is permitted to expand. The fuel, preferably in vapor form at this point, passes through the gas-permeable chamber 24 into the catalyst bed 22 where it is catalytically oxidized, thereby, producing heat sufficient to maintain the temperature of the catalyst bed 22 at or near its effective value. Preferably, the accumulator 36 will have the capacity, without being recharged, of supplying fuel to the catalyst for a 24-hour period or longer; adequate capacity is estimated to be a fraction of a quart of a liquid fuel such as gasoline. Thus, when the cold engine is once again rendered operative and exhaust gases flow into the converter 10, the catalyst bed 22 will be immediately effective in reducing undesirable exhaust gas emissions.

As a result of the flow of exhaust gases into the converter, the catalyst temperature will be increased. Should the temperature of the catalyst exceed the operable point of the temperature sensitive switch 52, the valve 48 will be energized to discontinue flow of fuel through the fuel supply line 46 to the converter. It is possible to eliminate the switch 52 and valve 48, but this would result in a system where fuel is fed to the converter 10 both when the engine is operative and inoperative. Also, it may be found desirable in some applications to eliminate the gas-permeable chamber 24, and to permit the fuel supply line 46 to discharge fuel in vapor form directly into the catalyst bed 22.

With particular reference now to FIG. 3, there is shown an alternative structure for the gas-permeable chamber 24. The gas permeable chamber in FIG. 3 is diagrammatically illustrated as being comprised of two gas-permeable shells 62 and 64 spaced from one another. Within the region between the two shells 62 and 64 is a catalyst material 66. The gas-permeable chamber 24 is located within the catalyst bed 22, the catalyst bed 22 being formed from a catalyst material different from the catalyst material 66. Thus, the catalyst material 66 can be particularly suited for assisting the chemical reaction of raw fuel vapor and air. Alternatively, the catalyst bed 22 may be formed from a mixture of two catalyst materials, one of them being particularly suitable for the reaction of raw fuel with air and the other being particularly suitable for use in oxidizing or reducing exhaust gases.

Based upon the foregoing description of the invention, what is claimed and desired to be protected by Letters Patent is:

1. A system for the purification of exhaust gases emanating from an internal combustion engine, which comprises: a catalytic converter containing a catalyst, said converter having an inlet for receiving and an outlet for discharging said exhaust gases; means for supplying fuel to said converter when said engine is inoperative; said means also being supplied with fuel by means driven by the engine during engine operation; and means for supplying air for mixture with said fuel supply to said converter when said engine is inoperative.

2. A system in accordance with claim 1, wherein said converter fuel supply means includes an accumulator and wherein said means for supplying fuel to said converter fuel supply means is a fuel pump for supplying fuel to said accumulator.

3. A system in accordance with claim 1, wherein said means for supplying fuel to said converter includes a gas-permeable chamber, an accumulator, a pressure regulator connected to said accumulator, and a fuel supply line connected to said pressure regulator and with said gas-permeable chamber.

4. A system in accordance with claim 3, which further comprises means for sensing the temperature of said catalyst and for discontinuing flow to said converter through said fuel supply line at catalyst temperatures above a predetermined value.

5. A system for the purification of exhaust gases emanating from an internal combustion engine, which comprises: a catalytic converter containing a catalyst, said converter having an inlet for receiving and an outlet for discharging exhaust gases; a fuel container; a fuel pump actuated during operation of said engine, said fuel pump being connected to said fuel container; means for supplying fuel to said converter when said engine is inoperative, said means including an accumulator for the storage of fuel under pressure, said accumulator having an inlet and an outlet, a check valve connected to said accumulator inlet and to said fuel pump to permit fuel flow into said accumulator inlet and to prevent fuel flow from said accumulator inlet, a pressure regulator connected to said accumulator outlet, and a fuel supply line connecting said pressure regulator with said converter; and means for supplying air for mixture with said fuel supply to said converter when said engine is inoperative.

6. A system for the purification of exhaust gases emanating from an internal combustion engine, which comprises: a catalytic converter containing a catalyst, said converter having an inlet for receiving and an outlet for discharging exhaust gases; a fuel container; a fuel pump actuated during operation of said engine, said fuel pump being connected to said fuel container; means for supplying fuel to said converter when said engine is inoperative, said means including a gas-permeable chamber positioned proximate said catalyst in said converter, an accumulator for the storage of fuel under pressure, said accumulator having an inlet and an outlet, a check valve connected to said accumulator inlet and to said fuel pump to permit said fuel pump to pump fuel into said accumulator during operation of said engine and to prevent fuel flow from said accumulator inlet, a pressure regulator connected to said accumulator outlet, and a fuel supply line connecting said pressure regulator with said gas-permeable chamber; and means for supplying air for mixture with said fuel supply to said converter when said engine is inoperative.

7. A system in accordance with claim 6, wherein said gas-permeable chamber comprises two gas-permeable shells spaced from one another, the region between said shells containing a catalyst material for assisting the chemical reaction of fuel and air.

8. A system in accordance with claim 6, with further includes means for discontinuing flow from said pressure regulator into said converter when said catalyst therein reaches a predetermined temperature value.

9. A system in accordance with claim 8, wherein said means for discontinuing flow from said pressure regulator into said converter is controlled by a temperature sensitive switch.

References Cited
UNITED STATES PATENTS

| | | | |
|---|---|---|---|
| 3,071,449 | 1/1963 | Shustack | 23—288 F |
| 2,807,930 | 10/1957 | Bratton | 23—288 F UX |
| 2,898,202 | 8/1959 | Houdry et al. | 23—288 F |
| 2,946,651 | 7/1960 | Houdry | 23—288 F X |
| 3,254,966 | 6/1966 | Bloch et al. | 23—288 F |

JOSEPH SCOVRONEK, Primary Examiner

U.S. Cl. X.R.
60—286, 300